United States Patent [19]

Lorenz et al.

[11] 4,385,137

[45] May 24, 1983

[54] DISPERSIONS OF POLYMERS CONTAINING SULPHONATE GROUPS, A PROCESS FOR THE PRODUCTION THEREOF AND THEIR USE AS COATING AGENTS

[75] Inventors: Otto Lorenz, Aachen; Dieter Dieterich, Leverkusen, both of Fed. Rep. of Germany

[73] Assignee: Bayer Aktiengesellschaft, Bayerwerk, Fed. Rep. of Germany

[21] Appl. No.: 328,967

[22] Filed: Dec. 9, 1981

[30] Foreign Application Priority Data

Dec. 19, 1980 [DE] Fed. Rep. of Germany ....... 3048085

[51] Int. Cl.$^3$ .......................... C08J 3/06; C08L 75/04; C09D 5/02
[52] U.S. Cl. ................................. 523/310; 428/423.1; 428/473; 428/913; 524/591
[58] Field of Search .................... 524/591; 523/310; 428/423.1, 473, 913

[56] References Cited

U.S. PATENT DOCUMENTS

| | | | |
|---|---|---|---|
| 3,479,310 | 11/1969 | Dieterich et al. | 524/591 |
| 3,539,483 | 11/1970 | Keberle et al. | 524/840 |
| 3,756,992 | 9/1973 | Dieterich | 524/591 |
| 3,959,173 | 5/1976 | Li et al. | 252/309 |
| 4,045,547 | 8/1977 | Le Boeuf et al. | 424/28 |
| 4,092,286 | 5/1978 | Noll et al. | 524/591 |
| 4,108,814 | 8/1978 | Reiff et al. | 524/840 |
| 4,156,675 | 5/1979 | Katayama et al. | 524/706 |
| 4,192,937 | 3/1980 | Noll et al. | 528/59 |
| 4,237,264 | 12/1980 | Noll et al. | 524/591 |
| 4,238,378 | 12/1980 | Markusch et al. | 524/591 |
| 4,269,748 | 5/1981 | Nachtkamp et al. | 524/839 |
| 4,306,998 | 12/1981 | Wenzel et al. | 524/591 |

FOREIGN PATENT DOCUMENTS

| | | |
|---|---|---|
| 928322 | 6/1973 | Canada . |
| 2634576 | 2/1978 | Fed. Rep. of Germany . |
| 2725589 | 12/1978 | Fed. Rep. of Germany . |
| 2900574 | 7/1980 | Fed. Rep. of Germany . |
| 54-37197 | 3/1979 | Japan ................................. 524/840 |
| 55-66945 | 5/1980 | Japan . |
| 1076688 | 7/1967 | United Kingdom . |
| 1280750 | 7/1972 | United Kingdom . |
| 1336050 | 11/1973 | United Kingdom . |

OTHER PUBLICATIONS

H. Warson, Polym. Paint & Colour Journal, 164, (1974), No. 3879, pp. 758–760.
M. S. Juang & I. M. Krieger, Journal of Polym. Science, Polym. Chem. Ed. 14, (1976) No. 9, pp. 2089–2107.
Lorenz et al, Kautschuk, Gummi, Kunststoffe 33, (1980) p. 527.
Loose translation of German Offenlegungsschrift 2,900,574 (believed to correspond to European Patent 0,013,440).
Abstract of Japanese Patent 55-66945

*Primary Examiner*—Ronald W. Griffin
*Attorney, Agent, or Firm*—Gene Harsh; Lawrence S. Pope; Thomas W. Roy

[57] ABSTRACT

The present invention is directed to aqueous dispersions having a solid content of at least about 10% by weight of polymers containing from about 0.1 to 6% by weight of incorporated sulphonate groups, characterized in that cations of at least divalent metals, silver or monovalent copper are present in the dispersions as counterions to the chemically-incorporated sulphonate anions to at least about 80 equivalent percent, based on the total quantity of the cations present.

Another object of this invention is a process for the production of such aqueous dispersions which is characterized in that aqueous dispersions having a solid content of at least about 10% by weight, of polymers containing from about 0.1 to 6% of incorporated sulphonate groups, in which alkali metal cations or monovalent ammonium cations are present as counterons, are treated with a cation exchanger which is charged with cations of the above-mentioned type.

A final object of this invention is the use of the dispersions according to the invention as coating agents in a coating operation for flexible or rigid substrates.

13 Claims, No Drawings

DISPERSIONS OF POLYMERS CONTAINING SULPHONATE GROUPS, A PROCESS FOR THE PRODUCTION THEREOF AND THEIR USE AS COATING AGENTS

BACKGROUND OF THE INVENTION

1. Field of the Invention

This invention relates to new dispersions containing monovalent copper or silver ions or cations of polyvalent metals of polymers containing sulphonate groups, to a process for the production thereof by treating dispersions of polymers containing sulphonate groups with ion exchangers containing such cations, and to the use of these dispersions as coating agents for flexible or rigid substrates.

2. Description of the Prior Art

A large number of aqueous dispersions of polymers containing sulphonate groups or processes for the production thereof are already known. Thus, for example, aqueous dispersions of polyurethanes containing sulphonate groups or processes for the production thereof are described in the following publications: U.S. Pat. Nos. 3,479,310; 3,756,992; 4,108,814 and 4,092,286, British Pat. Nos. 1,076,688; 1,336,050 and 1,280,750, German Offenlegungsschriften Nos. 2,030,571; 1,954,090; 2,651,505; 2,725,589; 2,732,131; 2,634,576 and 2,811,148. Other polymer dispersions which contain sulphonate groups have been described, for example, by H. Warson in Polym. Paint Colour J. 164 (1974), No. 3879, P. 758-760; by M. S. Juang, IMM. Krieger in J. Polym. Sci., Polym. Chem. Ed. 14 (1976), No. 9, P. 2089-2107 or in German Offenlegungsschriften No. 2,549,650 and No. 2,526,717.

The fact is common to these pre-known dispersions of polymers containing sulphonate groups that the counterions to the incorporated sulphonate anions constitute alkali metal cations or monovalent ammonium cations, in particular those which are derived from tertiary amines. Thus, the polyurethanes are so-called "polyurethane ionomers", which, on one hand, are self-dispersible in water due to their salt character but, on the other hand, after the processing of the dispersions as coating agents, result in coatings whose water-resistance is still worth improving.

It has now surprisingly been found that it is possible to exchange the cations mentioned and present in the known polymer dispersions, in particular polyurethane dispersions, for cations of the undermentioned type, by treating the dispersions with conventional cation exchangers. This finding is surprising because it would be expected that treatment of the dispersions with cation exchangers would result in coagulation. Moreover, the finding was completely surprising that the polymer dispersions thus obtained, on one hand, are practically just as stable in storage as the starting dispersions and, on the other hand, they allow the production of coatings which have a clearly increased water-resistance. Within the scope of analytical experiments, dispersions which contain free sulphonic acid groups have indeed been converted into the silver salt. However, these were extremely dilute dispersions having a solid substance content of only 1 to 2%, in which silver ions were then analytically determined (O. Lorenz et al., Kautschuk, Gummi, Kunststoffe 33 (1980), P 527). Such extremely dilute dispersions obviously cannot be used for the conventional areas of use of aqueous plastics dispersions. Moreover, coagulation would naturally not be feared with such extreme dilutions.

Accordingly, it is an object of the present invention to produce dispersions as hereinafter set forth which are stable in storage and result in the production of coatings which have improved water resistance.

SUMMARY OF THE INVENTION

The present invention is directed to aqueous dispersions having a solid content of at least about 10% by weight of polymers containing from about 0.1 to 6% by weight of incorporated sulphonate groups which apart from the dispersed polymers preferably do not contain any other water-soluble low-molecular-weight electrolytes added to the dispersions, characterized in that cations of at least divalent metals, silver or monovalent copper are present in the dispersions as counterions to the chemically-incorporated sulphonate anions to at least about 80 equivalent percent, based on the total quantity of the cations present.

Another object of this invention is a process for the production of such aqueous dispersions which is characterized in that aqueous dispersions having a solid content of at least about 10% by weight, of polymers containing from about 0.1 to 6% of incorporated sulphonate groups, in which alkali metal cations or monovalent ammonium cations are present as counterions, are treated with a cation exchanger which is charged with cations of the above-mentioned type.

A final object of this invention is the use of the dispersion according to the invention as coating agents in a coating operation for flexible or rigid substrates.

DETAILED DESCRIPTION OF THE INVENTION

In the process according to the invention, any aqueous dispersions of polymers may be used which
 (a) apart from the dispersed polymers, do preferably not contain any other water-soluble low-molecular-weight electrolytes added to the dispersions;
 (b) have a solid substance content of from about 10 to 55%, preferably from about 15 to 45%, by weight;
 (c) contain a polymer having from about 0.1 to 6%, preferably from about 0.2 to 3%, by weight of incorporated sulphonate groups as the disperse phase; and
 (d) contain, as counterions to the anionic sulphonate ions of the dispersed polymer, alkali metal ions, in particular lithium, sodium and/or potassium ions and/or monovalent ammonium ions, in particular those which are derived from tertiary amines.

Aqueous dispersions corresponding to this definition of predominantly linear polyurethanes, such as, for example, those named in the above-mentioned publications, are preferably used in the process according to the invention.

Cation exchangers which are suitable for the process according to the invention are those of the type known per se. This means that both inorganic cation exchangers, for example based on zeolite, as well as organic ionic exchangers, for example those based on sulphonated polystyrene or sulphonated styrene-divinyl benzene-copolymers, may be used. The last-mentioned organic ion exchangers are preferred.

Before the process according to the invention is carried out, the ion exchangers are charged in known manner with the required cations. Cations which are suitable are silver ions, ions of monovalent copper or any cations of at least divalent metals. The following are particularly suitable: ions of silver; of monovalent copper; or divalent calcium, barium, tin, lead, iron, cobalt, nickel, copper, zinc, of trivalent aluminum, antimony, bismuth, iron and/or of tetravalent titanium or zirconium. The following are particularly preferably used: the cations of silver, of divalent calcium, barium, nickel, copper, zinc or lead. Calcium and barium ions are of most particular interest.

When carrying out the process according to the invention, the quantity of the cation exchanger charged with the cations mentioned is generally measured such that from about 2 to 100, preferably from about 5 to 40 gram-equivalents of metal cations present in the cation exchanger are available for each gram-equivalent of sulphonate groups of the dispersed polymer.

It has proved to be appropriate particularly when using cation exchangers charged with at least divalent cations to incorporate into the polymer dispersions, before carrying out the process according to the invention, approximately from about 0.05 to 10%, preferably from about 0.5 to 5%, by weight based on solid substance, of a non-ionic surfactant and/or to use dispersions of such polymers which, in addition to the sulphonate groups, also contain approximately from about 0.02 to 8%, preferably from about 0.3 to 6%, by weight of incorporated, non-ionically-hydrophilic segments, in particular ethylene oxide units incorporated within polyether chains. Moreover, it is often appropriate to rinse the ion exchanger with an aqueous solution of a surfactant before carrying out the process according to the invention.

Suitable non-ionic surfactants which are optionally to be incorporated into the polymer dispersions are those of the type known per se, i.e., for example any non-ionic surfactant which contains from about 10 to 70%, preferably from about 20 to 60%, by weight of hydrophobic segments, in particular hydrophobic hydrocarbon radicals and from about 30 to 90%, preferably from about 40 to 80%, by weight of hydrophilic radicals, in particular ethylene oxide units incorporated within polyether chains, whereby the ethylene oxide units may be in the form of polyethylene oxide units or in the form of polyether chains whose alkylene oxide units consist of at least about 60%, preferably at least about 80%, of ethylene oxide units and with the remainder being other alkylene oxide units, e.g. propylene oxide units. Surfactants which are suitable are the following, for example: ethoxylated i-nonylphenols or, for example, the non-ionic emulsifiers corresponding to the above definition which are described in Ullmanns Encyklopädie der technischen Chemie, 4th edition, Vol. 10, pages 456–457.

Dispersions of polymers having incorporated polyether chains of the above-mentioned type and incorporated sulphonate groups which are particularly suitable for the process according to the invention are, for example, the dispersions described in U.S. Pat. Nos. 4,237,264; 4,092,286 or in German Offenlegungsschrift No. 2,651,506, of polyurethanes having incorporated sulphonate groups and incorporated non-ionically-hydrophilic groups.

In order to carry out the process according to the invention, the aqueous polymer dispersions are preferably treated with the cation exchangers in a temperature range of from about 5° to 60° C., in particular from about 15° to 30° C., for example in that the dispersion is allowed to run through a column filled with the ion exchanger. During this procedure, at least about an 80%, and in most cases, at least about a 90% exchange of the cations takes place so that at least about 80%, preferably at least about 90 equivalent percent of the cations present constitute those of the above-specified type in the products which result from the process according to the invention.

The dispersions according to the invention and resulting as products of the process according to the invention correspond to the starting dispersions with respect to their storage stability. However, they differ advantageously from these starting dispersions by the fact that the surface structures produced therewith have an increased water-resistance which is noticed by a reduced water-swelling. The dispersions according to the invention are suitable for all conventional areas of use for aqueous plastics dispersions. They are suitable, in particular, for coating any flexible or rigid substrates, e.g. paper, textiles, natural and synthetic leather, wood, metals or plastics, and are also suitable as an adhesive or impregnating agent or as a size for glass fibers or pigment coverings. Application is always carried out from the aqueous phase; however, the application technique depends upon the areas of use. Thus, it is possible, for example, to carry out a doctoring, coating, spraying, brushing or printing operation, whereby after the application, the water has to be removed.

The dispersions according to the invention and containing silver ions, in particular the corresponding polyurethane dispersions are suitable for the production of light-sensitive sheet structures and therefore constitute valuable crude materials for the production of light-sensitive photographic recording materials.

All the percentages in the following Examples relate to percent by weight.

EXAMPLE 1

(Production of an aqueous dispersion of a polyurethane containing sulphonate groups)

2000 g of a polyester diol obtained from adipic acid, neopentyl glycol and 1,6-dihydroxy-hexane (molar ratio: 16:11:6) of OH No. 56 (1 mol) are reacted with 289 g of hexamethylene diisocyanate (1.72 mols) at 110° C. into an NCO prepolymer having an NCO content of 2.6%. The NCO prepolymer is dissolved in 5.5 l of acetone. The acetonic solution is then stirred at 50° C. into a solution of 47.5 g (0.25 mol) of N-(2-aminoethyl)-2-aminoethane sulphonic acid sodium in 550 ml of deionized water. Finally, the acetone is drawn off under vacuum and a solid content of 17.75% is adjusted by the simultaneous addition of deionized water. The content of sulphonate groups in the dispersed polyurethane is 0.85%.

EXAMPLE 2

(Production of cation exchangers charged with cations)

In 8 parallel experiments, a glass column having an internal diameter of 20 mm and a height of 40 cm is filled in each case with 50 g of a strongly acidic cation exchanger of an average particle diameter of 1 mm. The cation exchanger is the sulphonation product of a polystyrene cross-linked with approximately 8% of divinyl benzene, having a content of sulphonic acid groups—$SO_3H$ of approximately 40%. The exchanger present in the $H^+$-form is charged with cations using 0.5 m of salt solutions until the eluate has the same pH value as the salt solution added. Then the material was washed with deionized water. In this manner, the columns were charged with silver ions, divalent ions of calcium, barium, nickel, copper, zinc and lead, or with aluminum ions. Finally, each column was washed with 100 ml of a 0.5% solution of the undermentioned ethoxylated nonyl phenol is deionized water, with the exception of the ion exchanger charged with silver.

EXAMPLE 3

(Process according to the invention)

The ion exchanger columns prepared according to Example 2 are each charged with 100 ml of the dispersion according to Example 1 at 25° C. Before charging the columns, 0.5 g of ethoxylated nonyl phenol containing approximately 15 ethylene oxide units per molecule was added to the individual 100 ml samples of the dispersion. The non-ionic wetting agent was only omitted in the exchange of $Na^+$ for $Ag^+$. The quantity ratio between the dispersion used and the ion exchanger corresponded in all of the experiments to an equivalent ratio of incorporated sulphonate groups to cations of the ion exchanger of approximately 1:40.

The following Table specifies the cation exchange determined complexometrically and the water swelling ($w_a$). In order to determine the water swelling, approximately 70 g of the approximately 9% dispersions are poured being as free of bubbles as possible in each case into a tank molded from a polyethylene film (200×100 mm) which is secured with a double-sided adhesive film to a glass plate. Drying takes place at room temperature. The water swelling of the film was determined gravimetrically. For this purpose, the non-ionic surfactant was initially extracted with water at room temperature and the film was then dried until constant in weight. The actual water swelling takes place by storing for 48 hours in deionized water. The swollen samples are dabbed with filter paper and are weighed in a weighing glass ($m_q$). Drying takes place at 80° C. until constant in weight. The mass break of the water when swollen ($w_a$) is $(m_q-m_t)/m_q$.

| Cation | % Exchanger | $w_a$ |
|---|---|---|
| $Na^+$ | — | 0.185 |
| $Ag^+$ | 97.6 | 0.145 |
| $Ca^{++}$ | 94.2 | 0.083 |
| $Ba^{++}$ | 95.9 | 0.098 |
| $Ni^{++}$ | 99.2 | 0.098 |
| $Cu^{++}$ | 94.2 | 0.100 |
| $Zn^{++}$ | 100 | 0.090 |
| $Pb^{++}$ | 95.9 | 0.086 |
| $Al^{+++}$ | 81.8 | 0.179 |

EXAMPLE 4

An aqueous dispersion of a polyurethane containing sulphonate groups was produced in analogous manner to Example 1 having 0.99% of sulphonate groups and a solid content of 37%. 200 ml of this dispersion were applied into a column containing 40 g of a strongly acidic, moist cation exchanger which was in the $Ag^+$- form. The column was charged as described in Example 2. For safety reasons, the column was pre-rinsed with 20 ml of a 1% solution of an ethoxylated nonyl phenol on average containing 15 ethylene oxide units per molecule, before charging with the dispersion. The dispersion was then passed through the column at a drop rate of from 15 to 20 drops per minute. In order to prevent the column from running dry, it was re-washed with a lttle deionized water. A dispersion resulted having a solid content of 28.4%, at which a quantitative exchange of $Na^+$ for $Ag^+$ had taken place, as could be indicated by a conductometric titration of the cation-exchanged dispersion using NaCl.

EXAMPLE 5

For the cation exchange of $Na^+$ and $Ca^{++}$, an aqueous dispersion produced according to example 1 of U.S. Pat. No. 4,237,264, of a polyurethane containing sulphonate groups, having 0.43% of sulphonate groups and 6% of chemically incorporated ethylene oxide units and a solid substance content of 40% was used. 50 g of this dispersion were introduced into a column containing approximately 45 g of a strongly acidic, moist cation exchanger which was in the $Ca^{++}$ form. After charging with a 0.5 m solution of $Ca(NO_3)_2$, the exchanger was washed with deionized water until the conductivity of the issuing water was 2.5 $\mu S$ $cm^{-1}$. The latex was passed through the column at a rate of approximately 15 drops per minute, and coagulation did not set in during this procedure. The column was re-washed with 50 ml of deionized water so that the solid content of the ion-exchanged dispersion was 20%. Complexometric titration of the dispersion resulted in a 0.991 mg $Ca^{++}$/g polymer, which corresponds to an ion exchange of 92.3%.

Films were cast from the starting dispersion and from the dispersion containing $Ca^{++}$ and the voltage values of the films were determined according to DIN 53 504. As indicated by the following values, the cation exchange of $Na^+$ for $Ca^{++}$-film causes a considerable improvement in the voltage values, in particular at an elevated temperature.

|  | 20° C. | | 80° C. | |
|---|---|---|---|---|
|  | $\delta$ 50$_2$ N cm | $\delta$ 100$_2$ N cm | $\delta$ 50$_2$ N cm | $\delta$ 100$_2$ N cm |
| $Na^+$ film | 175.4 | 237.1 | 113.4 | 156.8 |
| $Ca^{++}$ film | 210.4 | 281.5 | 174.3 | 237.1 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an aqueous dispersion of polymers which comprises
    (a) contacting an aqueous dispersion having a solid content of at least about 10% by weight of polymers containing from about 0.1 to 6% by weight of incorporated sulfonate groups in which alkali metal cations or monovalent ammonium cations are present as counterions with a cation exchanger charged with cations of at least divalent metals, silver or monovalent copper, and
    (b) exchanging at least about 80 equivalent percent of said counterions with cations of at least divalent metals, silver or monovalent copper.

2. The process of claim 1 wherein the cation exchanger is charged with cations selected from the group consisting of silver ions; ions of monovalent copper; ions of divalent calcium, barium, tin, lead, iron, cobalt, nickel, copper and zinc; ions of trivalent aluminum, antimony, bismuth and iron; and ions of tetravalent titanium and zirconium.

3. The process of claim 1 wherein said polymers are substantially linear polyurethanes and said cation exchanger is charged with silver ions or ions of at least divalent metals.

4. The process of claim 1, 2 or 3 which comprises adding 0.05 to 10% by weight, based on the solid content, of a non-ionic surfactant to the aqueous dispersion prior to step (a).

5. The process of claim 3 wherein said substantially linear polyurethanes contain from 0.05 to 10% by weight of incorporated non-ionic, hydrophilic polyether segments based on alkylene oxide units.

6. The process of claim 5 wherein at least about 60% of said alkylene oxide units are ethylene oxide units.

7. The aqueous dispersions produced in accordance with claim 1, 2, 3 or 5.

8. An aqueous dispersion having a solid content of at least about 10% by weight of polymers containing from about 0.1 to 6% by weight of incorporated sulfonate groups wherein at least 80 equivalent percent of the counterions to the incorporated sulfonate groups are cations of divalent metals, silver or monovalent copper.

9. The aqueous dispersion of claim 8 wherein said cations are selected from the group consisting of silver ions; ions of monovalent copper; ions of divalent calcium, barium, tin, lead, iron, cobalt, nickel, copper and zinc; ions of trivalent aluminum, antimony, bismuth and iron; and ions of tetravalent, titanium and zirconium.

10. The aqueous dispersion of claim 8 wherein said polymers are substantially linear polyurethanes and said cations are silver ions or ions of at least divalent metals.

11. The aqueous dispersion of claim 10 wherein said substantially linear polyurethanes contain from 0.05 to 10% by weight of incorporated non-ionic, hydrophilic polyether segments based on alkylene oxide units.

12. The aqueous dispersion of claim 8 wherein said dispersion does not contain any water-soluble, low molecular weight electrolytes.

13. The process of coating flexible or rigid substrates which comprises using the aqueous dispersions of claim 7 as the coating.

* * * * *